US007897289B2

(12) United States Patent
Otschik et al.

(10) Patent No.: US 7,897,289 B2
(45) Date of Patent: Mar. 1, 2011

(54) STACKABLE HIGH-TEMPERATURE FUEL CELL

(75) Inventors: Peter Otschik, Possendorf (DE); Klaus Eichler, Dresden (DE); Stefan Megel, Dresden (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 704 days.

(21) Appl. No.: 10/571,093

(22) PCT Filed: Aug. 30, 2004

(86) PCT No.: PCT/DE2004/001963
§ 371 (c)(1),
(2), (4) Date: Jan. 16, 2007

(87) PCT Pub. No.: WO2006/024246
PCT Pub. Date: Mar. 9, 2006

(65) Prior Publication Data
US 2007/0190391 A1   Aug. 16, 2007

(30) Foreign Application Priority Data
Sep. 8, 2003   (DE)   ................. 103 42 691

(51) Int. Cl.
H01M 8/24   (2006.01)
(52) U.S. Cl. .............. 429/468; 429/452; 429/465; 429/469
(58) Field of Classification Search ........ 429/37, 429/468
See application file for complete search history.

(56) References Cited

U.S. PATENT DOCUMENTS 5,064,734 A   11/1991   Nazmy (Continued)

FOREIGN PATENT DOCUMENTS

DE   4016157   * 12/1990

(Continued)

OTHER PUBLICATIONS

Selcuk et al., "Elastic Properties of Ceramic Oxides Used in Solid Oxide Fuel Cells (SOFC)," Journal of the European Ceramic Society, vol. 17, pp. 1523-1532, 1997.

*Primary Examiner*—Dah-Wei D Yuan
*Assistant Examiner*—Patricia Davis
(74) *Attorney, Agent, or Firm*—Jacobson Holman PLLC

(57) ABSTRACT

The invention relates to stackable high-temperature fuel cells which are combined to form so-called fuel cell stacks and also can be connected to each other electrically conductively in series and/or in parallel. According to the set object, such high-temperature fuel cells are intended to form an electrically conductive connection between a cathode and an interconnector which, even at temperatures above 800° C. and also in the oxidising atmosphere prevailing during operation of fuel cells, have a sufficiently high electrical conductivity, a chemically and mechanically adequate strength or stability. The high-temperature fuel cells according to the invention are connected, on the anode-side, to a fuel supply and, on the cathode-side, to an oxidant supply. The cathode is connected electrically conductively by means of at least one resilient contact element to an interconnector. The resilient contact element has one or more regions which exert a compression force on regions of the interconnector, the contact element being formed from an electrically conductive ceramic material.

17 Claims, 2 Drawing Sheets

U.S. PATENT DOCUMENTS

Figure 1:
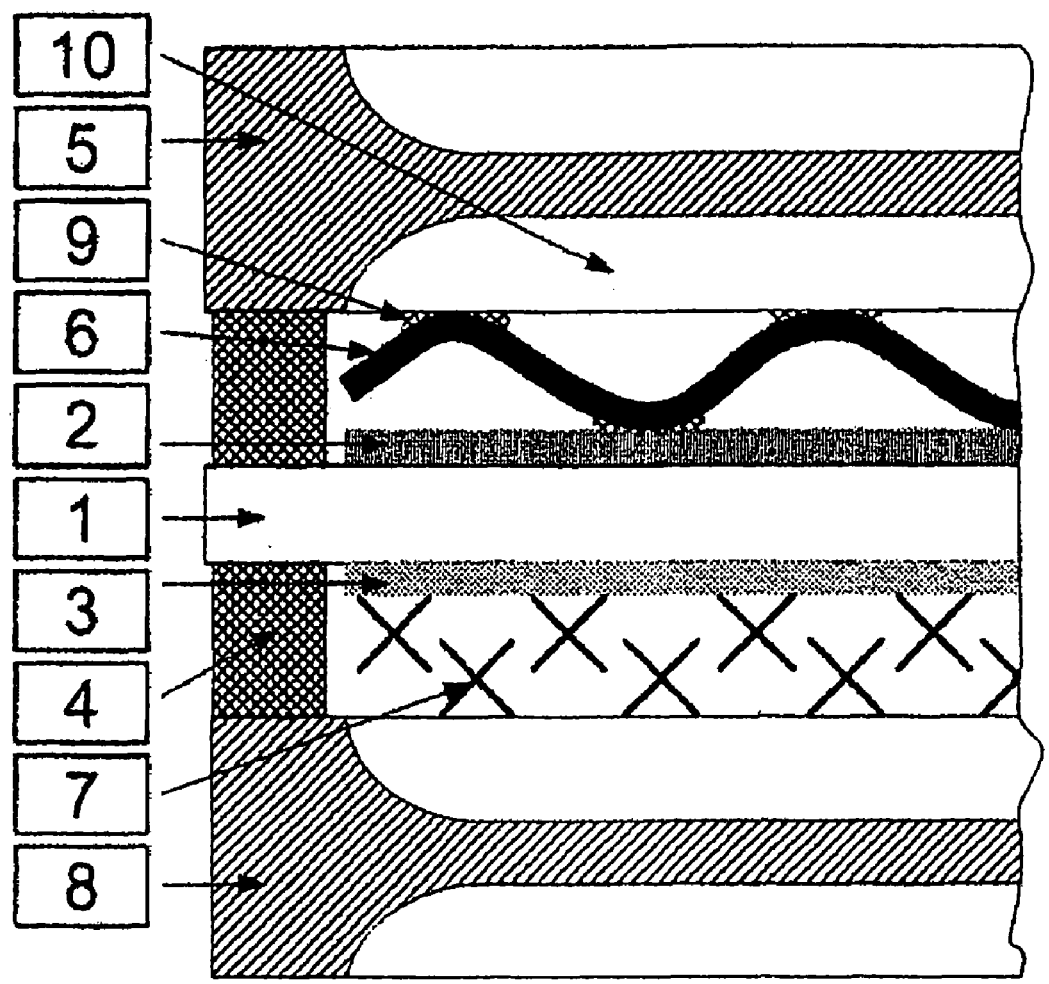

| | | | | |
|---|---|---|---|---|
| 5,273,837 | A | * 12/1993 | Aitken et al. | 429/30 |
| 5,516,597 | A | * 5/1996 | Singh et al. | 429/30 |
| 6,492,053 | B1 | * 12/2002 | Donelson et al. | 429/34 |
| 2003/0113609 | A1 | 6/2003 | Batfalsky et al. | |

FOREIGN PATENT DOCUMENTS

| | | | |
|---|---|---|---|
| DE | 4237602 | * | 5/1994 |
| DE | 4340153 | | 3/1995 |
| DE | 19609133 | | 9/1997 |
| DE | 19627504 | | 10/1997 |
| DE | 19649457 | | 6/1998 |
| DE | 19718849 | | 11/1998 |
| DE | 19710345 | | 1/1999 |
| DE | 19749004 | | 5/1999 |
| DE | 19835253 | | 1/2000 |
| DE | 19941282 | | 3/2001 |
| DE | 10027311 | | 12/2001 |
| DE | 10033898 | | 1/2002 |
| EP | 0410159 | | 1/1991 |
| EP | 0446680 | | 9/1991 |
| EP | 0556532 | | 8/1993 |
| EP | 0897897 | | 2/1999 |
| EP | 1060534 | | 2/1999 |
| JP | 01313855 | | 12/1989 |
| JP | 07094198 | | 4/1995 |
| JP | 09306518 | | 11/1997 |
| WO | WO2004/071150 | | 8/2004 |

* cited by examiner

STACKABLE HIGH-TEMPERATURE FUEL CELL

This is a nationalization of PCT/DE2004/001963 filed 30 Aug. 2004.

The invention relates to stackable high-temperature fuel cells which are combined to form so-called fuel cell stacks and such individual high-temperature fuel cells can be connected to each other in series and/or in parallel electrically and mechanically in order to obtain in particular higher electrical output powers.

In addition to the absolutely necessary elements of an individual fuel cell and here in particular the electrode-membrane unit, fuel cells frequently have at least one so-called interconnector. The interconnectors delimit the gas chambers above the anode or cathode and represent the electrical connection between the cathode of the one fuel cell and the anode of a further fuel cell.

Thus two interconnectors which are disposed opposite each other can also be present on one stackable high-temperature fuel cell according to the invention.

The interconnector is formed such that gas chambers for the fuel supply are present on the anode side and, on the cathode side, gas chambers for the oxidant supply.

For the actual function of the interconnectors, it is however necessary that an electrically conductive connection between anode (or cathode) of the one cell to the cathode (or anode) of further cells can be produced.

In particular the chemical and thermal conditions of the oxidising atmosphere in the region of the cathode present problems.

Thus proposals have been made in the past as to how an electrically conductive connection can be produced in this region.

Thus it was proposed for example to dispose networks or meshes made of metals in this region which are intended to ensure an electrically conductive bridging between cathode and corresponding interconnector. Thus the use of silver was suggested in DE 100 27 311 A1 and, in DE 196 49 457, the use of nickel in this form.

With these metals the problem exists however that evaporation can occur with silver, the silver being deposited in the cathode and consequently the efficiency of the respective fuel cell being greatly impaired.

Other metals, just as nickel, tend to oxidise, which of course leads likewise to a reduction in electrical conductivity in an undesired way.

It is known from DE 100 33 898 A1 to dispose a metallic perforated foil between a cathode and an interconnector, in which foil essentially an iron-base alloy is intended to be used. Such a perforated foil is intended to be curved in a plurality of undulations so that wave crests or wave troughs come into contact either with the cathode or with the respective interconnector and thus the electrically conductive connection can be produced.

Here also the high temperatures in conjunction with the oxygen required for the function of the fuel cell present problems which lead to oxidation or evaporation of alloy elements which reduce the electrical and also the mechanical properties and in particular here the strength and resistance to creep.

In order to counteract these effects, it was also proposed in DE 100 33 898 A1 to cover the surfaces of such a foil with a nickel-aluminium alloy or with nickel-aluminide in order to increase the thermal and chemical resistance under the conditions prevailing in this region.

It is obvious that such a protective layer causes a considerable additional production cost. Furthermore, such nickel alloys and in particular nickel-aluminide are only deformable with difficulty in a subsequent process so that corresponding problems arise here also.

Thus it will be necessary as a rule firstly to configure the corresponding wave shape of such a metal foil and subsequently to apply the respective alloy or the intermetal on the corresponding surface.

It is therefore the object of the invention to propose a possibility with which to form an electrically conductive connection between a cathode and an interconnector on a stackable high-temperature fuel cell which, even at temperatures above 800° C. and in the oxidising atmosphere prevailing during operation of the fuel cell, has a sufficiently high electrical conductivity and also chemically and mechanically adequate strength or stability.

According to the invention this object is achieved with a stackable high-temperature fuel cell which has the features of claim 1. Advantageous embodiments and developments of the invention can be achieved with the features described in the subordinate claims.

The stackable high-temperature fuel cell according to the invention, as is known also from the state of the art, has an electrode unit which is connected, on the anode side, to a fuel supply and, on the cathode side, to an oxidant supply, and also an interconnector which produces the gas distribution over the electrodes and the electrical contact. An electrically conductive resilient contact element is disposed between the cathode and this interconnector, said contact element having a shape with which it is ensured that regions of the contact element touch both the cathode and regions of the interconnector, a compression force being exerted in these regions by the shape of the contact element and the arrangement of cathode and interconnector so that, despite the spacing changes between electrode and interconnector occurring during operation of the fuel cell, the electrically conductive connection between cathode and interconnector can be ensured on a long-term basis.

However, the possibility also exists according to the invention of disposing a plurality of such resilient, electrically conductive contact elements between cathode and the interconnector.

According to the invention, the resilient contact elements are formed from an electrically conductive ceramic material. It has emerged surprisingly that such ceramics which are stable and resilient to a sufficient degree on a long-term basis can be produced in corresponding suitable shapes.

Ceramics with good electrical conductivity from the group of perovskites or other ceramics are possible as material.

Suitable perovskite ceramics are for example an LSMC (e.g. $La_{0-8}Sr_{0.2}Mn_{0.9}Co_{0.1}O_{3-x}$), a uLSMC (e.g. $La_{0.75}Sr_{0.2}Mn_{0.9}Co_{0.1}O_{3-x}$), uLCM (e.g. $La_{0.75}Ca_{0.2}MnO_{3-x}$), uLSM (e.g. $La_{0.75}Sr_{0.2}MnO_{3-x}$), LSM (e.g. $La_{0.8}Sr_{0.2}MnO_{3-x}$), LSC e.g. $La_{0.8}Sr_{0.2}CoO_{3-x}$), or LSCFe (e.g. $La_{0.6}Sr_{0.4}Co_{0.2}Fe_{0.8}O_{3-x}$).

As other suitable ceramics, materials are conceivable with the basic compositional form: $AB_2O_3$, $A_2BO_4$ or $A_2B_2O_7$, the A position being able to be occupied by Y, Sc, Ce, La, Pr, Nd, Sm, Eu or Gd if necessary in combination with Mg, Ca, Sr or Ba.

Occupation of the B position is possible with Ti, V, Cr, Mn, Fe, Co, Ni, Zn, Zr, Nb, Mo, W, Sn, Sb, Pb or Bi.

The contact elements can be used made from a correspondingly suitable ceramic in the form of foils which comprise a powder of the respective ceramic in which 50% of the powder grains have a diameter below 2 to 5 µm. Approximately 2.5 µm are preferred, which can be produced in a manner known per se. Such foils can be produced by a casting process with a relatively small thickness, relatively small wall thickness differences being noted. In the raw state, subsequent processing of such foils can be effected in order to be able to effect smoothing and a further wall thickness reduction.

Subsequent thereto sintering can then be implemented.

The possibility exists of implementing the desired shaping configuration of contact elements on the raw foil, i.e. prior to sintering.

In an alternative, the shaping can however also be effected after sintering by machining (grinding).

In addition, throughflow openings can be formed on contact elements for better oxidant supply of the cathode before or even after sintering.

The finished contact elements are then present as a foil in the desired form and have wall thicknesses in the range between 20 and 150 μm, wall thicknesses of approximately 50 μm being preferred in order to achieve favourable mechanical properties and a sufficiently high electrical conductivity.

One or more contact elements formed in this way can then be disposed between the interconnector and the cathode. Interconnector and electrode-membrane unit can then be connected to each other mechanically by means of an outer edge element (joint glass frame), the connection requiring to be formed such that, as a result of the spacing between interconnector and cathode and also the dimensioning of the one or more contact element(s), a pre-tension of the contact element(s) is achieved which leads to the desired compression force application.

Such an edge element should be formed from an electrically non-conductive material, but should have at least one electrical insulation layer.

On the basis of sealing requirements, the electrode-membrane unit must be shaped such that the joint glass frame forms a seal on the solid electrolyte. A "joint glass" suitable for this purpose is described in EP 0 897 897 A1.

Subsequently, a few suitable shapes for contact elements with which the desired resilience can be achieved are intended to be explained.

Thus individual contact elements can have an undulating, wedge or even trapezoidal shape, a contact element being able to be used as a correspondingly shaped flat structure, and the individual waves, wedges or trapezoids thereby being able to be aligned respectively parallel to each other.

In particular in the case of undulating or wedge-shaped contact elements, linear contact regions at which the corresponding compression forces act are then produced.

However the possibility also exists of configuring one or more of such contact elements likewise as flat elements, punctiform raised portions and depressions then being formed on such a contact element, which are disposed discretely relative to each other so that for example the raised portions can be in touching contact with the interconnector and the depressions can then correspondingly be in contact with the cathode.

In the case where a plurality of individual contact elements is to be used on such a fuel cell, these can be configured as open or closed tubular elements.

There should therefore be understood by a closed tubular element, such an element which has a radially completely circumferential peripheral face, whereas the two oppositely situated end-faces are open.

There should be understood as an open tubular element, an element, the casing of which has a transverse section which corresponds to a more or less large partial circle. Thus such an element can be configured for example in the form of a tube which is cut along its longitudinal axis and has a peripheral face with half the circumference of a tube.

Such individual contact elements which can be used in a plurality in a fuel cell can however also have a trapezoidal or wedge-shaped configuration.

A plurality of these individual contact elements can be used preferably in a fuel cell in which oxidant channels are formed on the interconnector. In this case the contact elements can then be inserted such that they are supported in a planar or linear manner on the webs, which separate the individual oxidant channels from each other, with compression force application.

A contact element can thereby be disposed such that its contouring is aligned parallel or transversely relative to gas, channels configured on an interconnector.

This state of affairs applies analogously to the arrangement of a plurality of individual contact elements or with respect to the alignment of their longitudinal axes for alignment of the gas channels.

Thus greater surface areas can be in contact with each other in the case of a parallel alignment. In the case of an alignment transversely relative to the gas channels, the adjustment complexity is reduced.

With the solution according to the invention, it is however no longer absolutely necessary to use an interconnector with oxidant channels since the oxidant can be guided through the formed free spaces of the contact element or of a plurality of contact elements. Consequently, the cathode-side surface of the interconnector can have a flat configuration, as a result of which the production costs can be significantly reduced.

In order to apply the pre-tension of the contact elements, it is advantageous to configure, dimension and arrange these within the fuel cell such that at least one outer end-side abuts on the face of the edge element pointing inwards such that this end-side is correspondingly supported and a quasi abutment is formed.

In particular for compensation of a heat expansion during operation of the fuel cell, it is favourable to configure and arrange a contact element such that at least one end-side abuts at a spacing relative to the cathode and likewise at a spacing relative to the interconnector on the edge element and is supported there, then a compensation movement of this end-side can be achieved in the direction of the cathode or the interconnector if, as a result of different temperatures, a heat expansion compensation of contact elements is required.

In the production of contact elements the possibility also exists however of adjusting porosity, with which it is ensured that the contact element(s) is/are permeable for the oxidant.

In this case, the formation of throughflow openings on the contact elements can if necessary then be dispensed with.

Contact elements comprising fibres of an electrically conductive ceramic which are sintered together and form a nonwoven fabric can however also be used. Favourable conditions can thereby be taken into account by an advantageous configuration of such nonwoven fabrics with respect to the desired electrical conductivity, elasticity and permeability/porosity. Different regions, which have respectively different elasticities, porosities and densities, can then be formed on such nonwoven fabrics.

In the production of such nonwoven fabrics, the procedure can be such that the operation takes place according to the ALCERU process which is known per se. Cellulose fibres are hereby loaded with the respective electrically conductive ceramic powder. Ceramics suitable for this purpose have already been mentioned.

For the production of a raw nonwoven fabric with homogeneous surface density, the procedure can be such that the respective fibres are mixed thoroughly in a solution. Thereafter, the solvent is withdrawn by means of a sieve and the raw nonwoven fabric is dried. A homogeneous raw nonwoven fabric with a uniform fibre distribution is thereby produced.

The then present raw nonwoven fabric can be deformed in regions with a suitable shaping tool and hence specific regions can be compressed. The deformed raw nonwoven fabric correspondingly has a surface structure with raised portions and depressions, the raised portions being able to be formed in the form of webs, i.e. a quasi channel-web structure can be obtained.

In the regions compressed in advance, the fibres lie more densely beside each other and can therefore be sintered together better. In the less compressed regions, i.e. in the raised portions/webs, the increased elasticity of fibres is maintained so that good pressing onto the cathode and interconnector with these raised portions/webs can be achieved and the more highly compressed regions have a correspondingly higher electrical conductivity.

Since the fibres which are used for the nonwoven fabrics have a smaller thickness and are relatively brittle after sintering, they can be stabilised with an organic coating.

They have a corresponding porosity/permeability so that they make possible the desired gas distribution.

In order to increase the electrical conductivity of the contact element they can be soaked with a dispersion. This dispersion can contain noble metals or ceramics and they make possible an improved bonding of the fibres. When using ceramic powder, fine powder ($d_{50}$<1 µm) should be used so that good sintering can be achieved even at relatively low sintering temperatures.

The more highly compressed regions of a contact element formed in nonwoven fabric form can thus have densities in the range between 3 and 6.5 $g/cm^3$ and the non-compressed or less compressed regions which form raised portions or webs can have a density in the range between 1 and 4 $g/cm^3$. The last-mentioned regions achieve a minimum elasticity of 5% which can be increased up to 40%. There is a porosity of approximately 70% so that a gas exchange is readily possible through such a nonwoven fabric.

The fibres can have diameters in the range between 5 and 100 µm.

The electrically conductive contact of contact elements with the cathode and/or the interconnector can be improved with the help of a contact layer which is applied on the cathode, cathode element and/or the interconnector. It can be pressed onto the corresponding individual parts before assembling the fuel cell stack and/or can be introduced during the assembly process via the gases as powders which are then deposited at the contact points and, at correspondingly increased temperatures, the contact layers are formed from the powder.

Thus such contact layers should be formed at the regions of punctiform or linear contact of contact elements on the cathode and/or interconnector. The contact layers can be present in this case also in the wedge region of contact elements with cathode and/or interconnector. The contact layers can likewise be formed from an electrically conductive ceramic.

The fuel cell, as has been described essentially previously, in which merely the cathode-side contact is produced via the elastic contact element, can also have a contact of the anode side with the interconnector via an elastic contact element.

In this case, contact elements can also be disposed between the interconnector and the anode, as has already been explained above.

The contact elements to be used according to the invention meet the functional requirements during operation of fuel cells over a significantly increased number of operating hours. An electrical conductivity which is virtually unaltered over the entire lifespan is maintained even at temperatures above 800° C. The contact elements to be used according to the invention are both chemically and mechanically stable. An effect on the electrode unit is not effected and the resilient properties and the electrical conductivity are maintained on a long-term basis.

Cyclisation of the fuel cell is possible without problems due to this contact.

The invention is intended to be explained in more detail subsequently by way of example.

Figure 2:
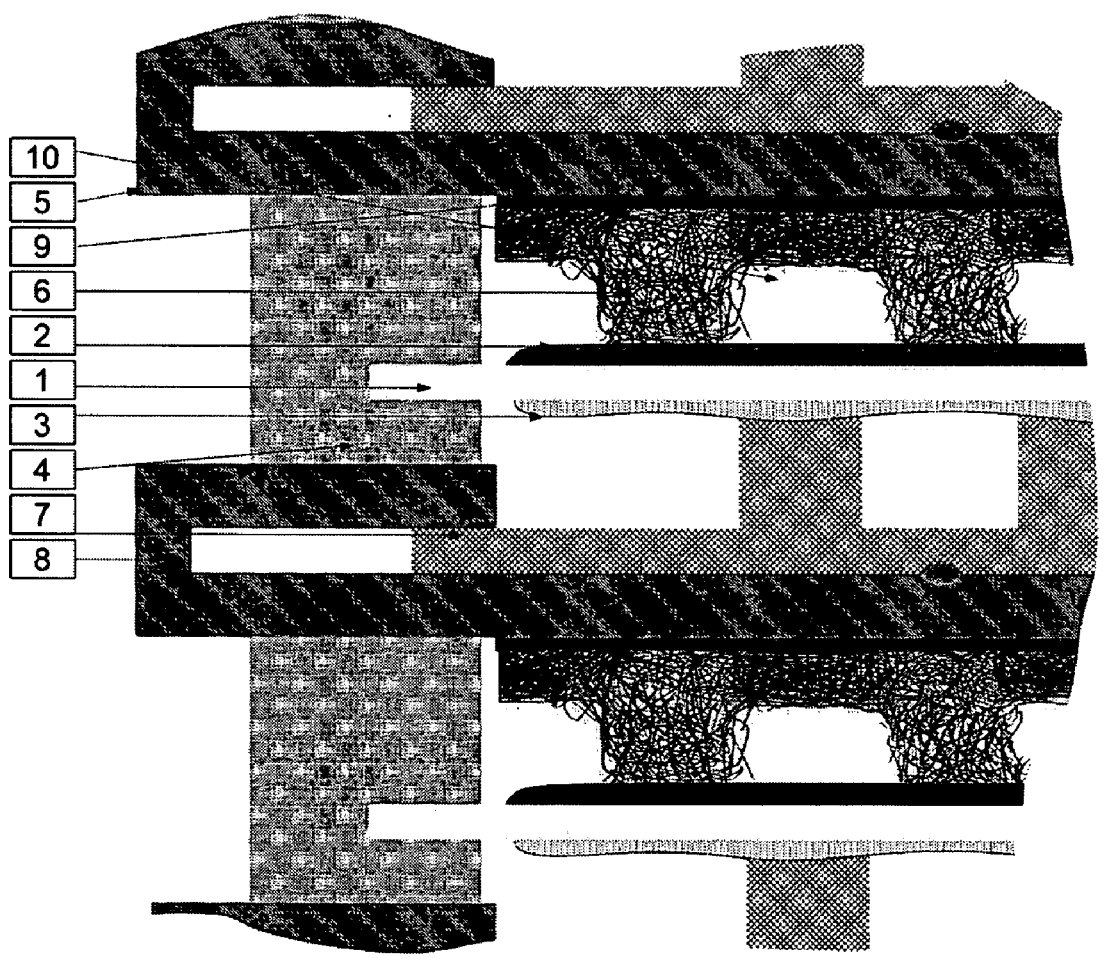

There are thereby shown:

FIG. 1 an example of a stackable high-temperature fuel cell according to the invention in a partial section and FIG. 2 an example with a nonwoven fabric as contact element.

In the example shown in FIG. 1, an electrode unit formed from cathode 2, solid electrolyte 1 and anode 3 is disposed between interconnectors 5 and 8. The sealing of the gas chambers is effected via an edge element 4 comprising a glass ceramic. The edge element 4 thereby fulfils the connection task between the previously described elements and fixes the spacing between cathode and the cathode-side interconnector 5. As a result, the pre-tension on the elastic contact element 6 is maintained.

In this example, the contact element 6 is a planar element with an undulating configuration, the wave crests of which are in touching contact through a contact layer 9 with the cathode-side interconnector surface in regions and the wave troughs of which or oppositely-situated wave crests are in touching contact with the cathode 2. As a result of the fixed arrangement of cathode 2 and interconnector 5 and also the dimensioning and shape of the contact element 6 with the resilient properties thereof, compression forces act on the contact regions which in this case ensure a sufficiently high electrical conductivity between cathode 2 and interconnector 5.

In this example, the surface of the interconnector 5 has been structured so that oxidant channels 10 are present. This is however, as already mentioned in the general part of the description, not absolutely necessary since the gas channels can also be formed by the contact element(s) 6.

A contact element 6, as can be used in the example according to FIG. 1, can be produced using an LSMC powder falling within the group of perovskite ceramics. Such a powder can have the structure designated with $ABO_3$, the A position being occupied by 80% lanthanum and 20% strontium and the B position by 90% manganese and 10% cobalt ($La_{0.8}Sr_{0.2}Mn_{0.9}Co_{0.1}O_{3-x}$).

The ceramic powder used had a volume distribution in which 50% of the powder grain diameters were under 2.5 µm.

Using the LSMC powder, a raw foil was cast in the manner known per se and was ground subsequently to a total thickness of 80 µm.

The ground raw foil was subsequently sintered on porous $Al_2O_3$ plates at a temperature of 1400° C. over a period of three hours.

The sintered foils should have a thickness of approximately 50 µm in order to ensure the desired resilient properties and also a sufficiently high electrical conductivity.

In addition to the wall thickness of the sintered contact elements, the pre-tension can also be influenced by the geometric configuration of the contact element 6 to be used correspondingly according to the invention.

The geometric configuration, i.e. the undulating shape for example shown in FIG. 1, can be formed already during sintering by corresponding configuration of the $Al_2O_3$ plates.

However the possibility also exists of configuring the shaping by machining (grinding).

In the case where throughflow openings are intended to be present on contact elements, these can be formed very simply before and also after sintering e.g. by means of laser cutting.

In FIG. 2, a further example of a stackable high-temperature fuel cell according to the invention is shown. The same elements were thereby provided in turn with the same reference numbers as in the example according to FIG. 1.

In this example, in contrast to the example according to FIG. 1, contact elements 6 were however used which were produced from structured nonwoven fabrics as explained in the general part of the description.

Fibres of a uLSM ceramic with a diameter of 30 μm with a bulk density of 6.5 g/cm$^3$ were thereby used and deformed by compression in the raw form so that the surface structure which can be detected clearly in FIG. 2 was produced. An elastic and form-fitting contact to the respective interconnectors 5 can be achieved.

The less compressed regions of the nonwoven fabric of the contact element 6 form web-like raised portions and are in touching contact with the cathode 2 and these less compressed regions have an elasticity of 5% and a density of 2 g/cm$^3$ and achieve a porosity of approximately 70%.

The more highly compressed regions in the example shown here have a density of 5 g/cm$^3$.

If the elastic range of the fibres is exceeded, the result is that the individual fibres break away and new contact sites are formed. When assembling stacks, fairly large tolerances can therefore be compensated for.

On the other side, i.e. between anode 3 and interconnector 5, a structured nickel foam 7 is provided for a contact.

The invention claimed is:

1. Stackable high-temperature fuel cell having an electrode unit including an anode located on an anode side and a cathode located on a cathode side, said electrode unit connected, on the anode side, to a fuel supply and connected, on the cathode side, to an oxidant supply, said cathode connected electrically conductively by at least one resilient contact element to an interconnector, wherein said at least one resilient contact element exerts a compression force on regions of the cathode and regions of the interconnector, each said contact element formed from a sintered nonwoven fabric of an electrically conductive ceramic having a uniform material composition throughout the body of the fabric and having regions of relatively higher and lower compressibility and density resulting from physical shaping in regions along a surface of the fabric to provide a surface structure in the form of alternating depressions and raised portions, adjacent to each other each raised portion being a region of relatively lower compressibility and density and forming a web and wherein said regions of lower compressibility and density have an elasticity of at least 5%.

2. Fuel cell according to claim 1, characterised in that the ceramic material is selected from the group of perovskites or from a ceramic with the basic compositional form $AB_2O_3$, $A_2BO_4$ or $A_2B_2O_7$.

3. Fuel cell according to claim 1, characterised in that the contact element(s) (6) is/are configured as a foil with a wall thickness in the range 20 to 150 μm.

4. Fuel cell according to claim 1, characterised in that interconnector and cathode are connected to each other mechanically by means of an outer edge element such that the contact element(s) is/are pre-tensioned.

5. Fuel cell according to claim 1, characterised in that the contact element(s) have an undulating, wedge or trapezoidal shape.

6. Fuel cell according to claim 1, characterised in that each said contact element is configured with punctiform raised portions and depressions which are disposed discretely relative to each other.

7. Fuel cell according to claim 1, characterised in that each said contact element is configured as open or closed tubular elements.

8. Fuel cell according to claim 1, characterised in that each said contact element, in strip form with waves, is disposed on the webs configured on the interconnector.

9. Fuel cell according to claim 1, characterised in that each said contact element is partially circular, trapezoidal or wedge-shaped which are open on one side.

10. Fuel cell according to claim 1, characterised in that contact element(s) are supported in a planar or linear manner on webs, which separate oxidant channels from each other and are formed on the interconnector, with compression force application.

11. Fuel cell according to claim 1, characterised in that the contact element(s) are fixed by the edge element.

12. Fuel cell according to claim 1, characterised in that throughflow openings are formed on the contact element(s).

13. Fuel cell according to claim 1, characterised in that the contact element(s) has a porosity which is sufficient for oxidant permeability.

14. Fuel cell according to claim 1, characterised in that the cathode-side surface of the interconnector is configured as a flat surface area and the configuration of the gas chambers is effected by the contact element(s).

15. Fuel cell according to claim 1, characterised in that a contact layer is formed at regions of punctiform or linear contact of contact element(s) with the cathode and/or the interconnector.

16. Fuel cell according to claim 1, characterised in that the frame element is formed from a glass ceramic.

17. Fuel cell according to claim 1, characterised in that at least one resilient, ceramic contact element is disposed between the anode and the anode-side interconnector.

* * * * *